Sept. 15, 1953     W. W. HARTMAN ET AL     2,652,118
BASKET GUIDE

Filed July 25, 1949     2 Sheets-Sheet 1

William Walter Hartman
Robert Alexander Stops
INVENTORS

BY Robert Alexander Stops
Attorney

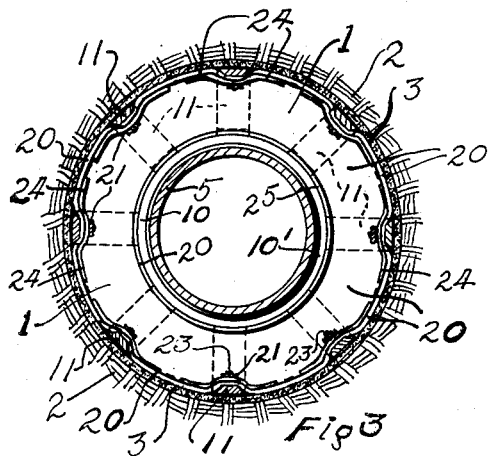
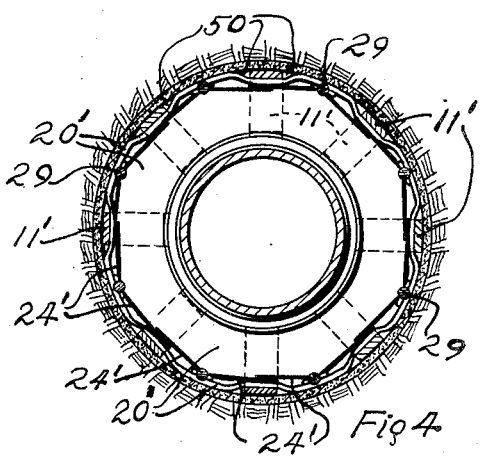
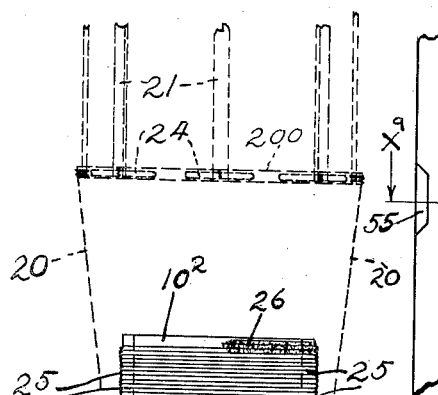
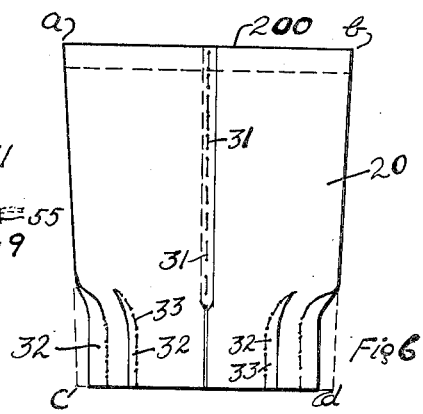
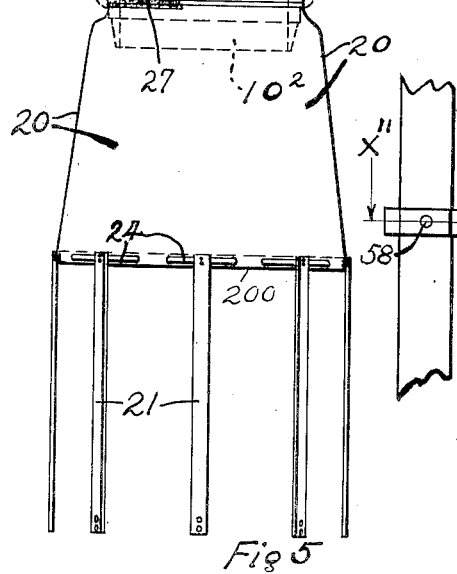
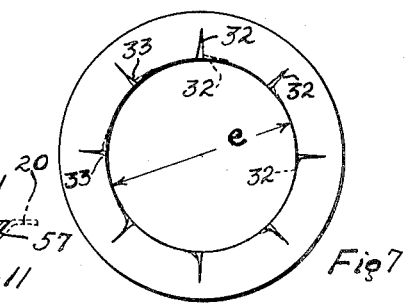

Patented Sept. 15, 1953

2,652,118

UNITED STATES PATENT OFFICE 2,652,118

BASKET GUIDE

William Walter Hartman and Robert Alexander Steps, Los Angeles, Calif.

Application July 25, 1949, Serial No. 106,564

5 Claims. (Cl. 166—13)

Our invention relates to basket guides for use in wells drilled in conformity with modern rotary methods.

Such wells are often drilled to great distances into the earth, and at various depths the well may be cemented, usually to seal off certain strata that contain unwanted fluids or gases.

Such cementing is effected by drilling the well of larger diameter than the pipe and couplings to be installed in the well. Later, when the pipe is set therein to the desired depth, waterproof cement is pumped down through the pipe until it reaches a seal or closure located therein in the locality where the cementing is to be done. Above this closure the wall of the pipe is provided with transverse openings or ports through which the pumping action forces the cement to flow out from the pipe into the annular space between the pipe and the well wall. For the purpose of preventing the cement from settling or passing in noticeable quantity downward through the last named space and to force it rather to rise upward to fill the space outside the pipe to a substantial distance above said ports, it is customary to install on the pipe below the ports a device called a basket. This substantially spans and more or less closes off the space between the wall of the well and the outside of the pipe, thereby forcing the cement upward as described. When the cement so placed sets, it obviously forms a plug in the well and seals off the unwanted fluids or gases contained in the strata adjacent this plug.

In order that such cement body or plug thus formed outside the pipe may effectively seal the adjacent strata as just stated, it is desirable that the pipe be accurately centered in this plug, so that the thickness of cement will be substantial and uniform all around the pipe, rather than to have the cement thick on one side and correspondingly thin and therefore fragile on the other side of the pipe, as would occur if the pipe leaned to one side of the hole. Various devices for thus centralizing the pipe in the well, i. e. in the cement plug, are well known, such devices being usually designated by the broad term "guide," and this term will be so used in this application.

A principal object of our invention is to provide in a single device a strong efficient combined mechanism that will be both a guide and a cement basket, and that will perform in combination the tasks of both these devices in manner substantially better than those tasks were heretofore performed when these devices were separate.

In drilling wells by the rotary method, some of the water portion of the mud water used in drilling leaks slowly out through the porous sides of the well, and the earthy walls of the well then act somewhat like a filter to filter out and collect in the form of a layer on the wall of the well the mud that remains from the water that leaked out. Usually it is desired to disrupt and disturb this mud layer as little as possible during certain of the operations of drilling and completing the well, the reasons for this being well understood by those skilled in the art.

In connection with the observation just made, we now wish to point out an important circumstance which repeatedly occurs during the process of setting or lowering the pipe into the well.

The first pipe section is lowered into the well until its coupling at the top thereof comes down close to the rotary table, at which time wedgelike members called slips are inserted into the rotary table, and these slips then wedge against and grasp the pipe firmly to hold the pipe from falling into the well. The next pipe section is then lifted into place over the first one, with its lower threaded male end immediately over and directed into the threaded coupling of the first section, and the two pipe sections are then screwed and fastened together by means of the coupling referred to. By means of derrick equipment the two pipe sections are then raised perhaps a foot or two to take the weight of the pipe off said wedgelike slips so the latter can be pulled up and out of the rotary table to enlarge the hole through latter. Both sections of pipe, and the coupling of the first section, are then lowered through this enlarged hole into the well until the coupling at the top of the second section comes down close to the rotary table, in the manner that was described for the first pipe section. Said wedgelike slips are then replaced in the table to grasp and hold the second pipe section just below its coupling, as was described for the first pipe section. In manner identical with that just stated, the third pipe section and all subsequent ones are then successively screwed together and lowered into the well until the entire string is eventually set. Of course, it is understood that one or more baskets of whatever type used are installed on one or more of the pipe sections, usually on one of the lower sections, depending on where the cementing is to be done.

As each pipe section is added to the preceding one, it is necessary to lift by a foot or two the entire string of pipe and basket in the well, for the purpose of permitting the withdrawal of the slips from the table as previously described. This lifting of the spring in wells of usual depth is frequently repeated many times, say 100 or 200 times, or more, before the entire string of pipe and the basket are finally in place in the well.

It is apparent that this frequently repeated operation of lifting the pipe and basket may often cause the basket to scrape substantial amounts of mud off the well wall, and such scraped-off mud tends to pass downward to collect finally in a considerable mass or body in and just above the basket, reaching up perhaps to places above the ports from which the cement will issue from the pipe during the subsequent cementing process, all of which is quite objectionable and undesirable. As far as we know, the tendency toward this undesirable result is inherent in all baskets used prior to our invention, for the reason that such baskets are all practically fastened to the pipe and must therefore rise with the pipe each time the latter is raised to remove the slips, as described.

An important object of our invention is to avoid this upward movement of the basket each time the pipe is raised and thereby also to avoid the objectionable consequences resulting therefrom, as above described. We attain this important object principally by so organizing our basket guide that it is not mounted rigidly on the pipe but permits the pipe to slide a substantial but limited distance through it. Consequently, when the pipe is raised to remove the slips, the pipe slides upward through our basket guide which remains stationary in the well during this movement. This contrasts with previous baskets which are practically fastened to the pipe and must therefore rise with same each time the pipe rises to permit removing the slips. The improvement resulting from our invention is of importance.

It is a further object of our invention to hold the flexible basket upright inside the powerful guide springs of our device in such manner that the basket can readily flex or collapse radially inward to permit the fluid that fills the well to pass readily from below to above the basket during setting of the pipe, without injuring the basket and without requiring substantial flexing of the main guide springs.

It is a further object of our invention so to form and mount the flexible basket inside the strong outwardly-bowed guide springs of our device, that when the cement fills and bears down on the basket the latter will belly out against the inside of said strong guide springs to receive powerful support and reinforcement therefrom.

Other objects and advantages of our invention will become clear through consideration of the appended drawings, the subsequent detailed description, and the claims.

The spirit of our invention as defined by the terms of the appended claims can be embodied in structures differing substantially from each other, but we have selected for illustration in the drawings and for detailed description herein, a preferred form of such embodiment together with certain preferred modifications thereof.

In the various figures of the drawings, like parts are designated by like reference numerals.

In the drawings,

Fig. 3 is a transverse section taken through Fig. 1 along line $X^3$—$X^3$ looking downward.

Fig. 4 is a similar section taken through Fig. 2 along the line $X^4$—$X^4$.

Fig. 5 shows one form of our flexible basket with certain parts attached thereto, prior to assembly thereof in our basket guide, the purpose of this figure being to illustrate a preferred manner of fastening this form of basket to the lower collar of the device.

Fig. 6 is a side view of one form of our flexible basket.

Fig. 7 is a bottom view looking upward at the form of basket shown in Fig. 6.

Fig. 8 shows a vertical view of a fragment of one form of our main guide spring, looking from inside outward.

Fig. 9 is a transverse horizontal section, looking downward, along line $X^9$—$X^9$ of Fig. 8.

Fig. 10 is a view similar to Fig. 8, but shows a modification subsequently described.

Fig. 11 is a transverse horizontal section, looking downward, and taken along line $X^{11}$—$X^{11}$ of Fig. 10.

Figures 1, 2:
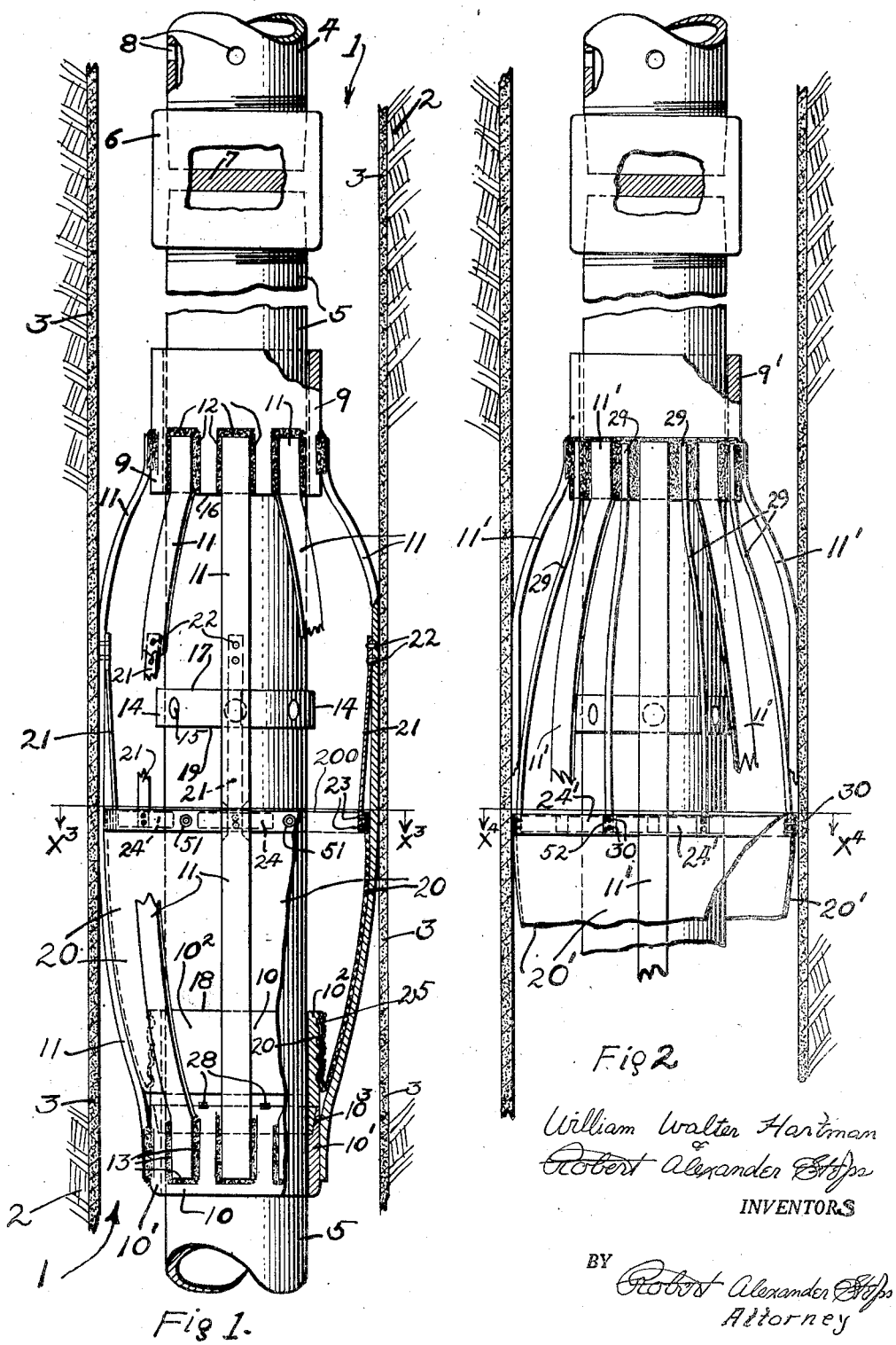
Fig. 1 is a transverse vertical section through the well showing our basket guide mounted on the well pipe therein, certain parts of the device being broken away or being partially sectioned for purposes of clarity.
Fig. 2 is a view similar to Fig. 1, but shows a modification of our basket guide.

In Fig. 1, the well 1 is shown drilled into the earth formation 2, and on the inner wall of the well is shown the mud layer 3 formed in manner already described. Into this well has been lowered the pipe string of which only two sections 4 and 5 are shown. These pipe sections are shown with threaded ends and the sections are firmly screwed together by means of the threaded coupling 6. Most couplings in the string are of the well known conventional type open straight through, but in the coupling 6 shown in Figs. 1 and 2 there is added in diagramatic form a seal or closure 7 which closes off the pipe so that cement pumped down through the string from the surface of the earth cannot pass below closure 7. Above closure 7 the transverse openings or ports 8 are provided in the wall of pipe section 4 to permit the cement to pass out from the pipe into the annular opening between the pipe and the well wall. The parts thus far mentioned in this paragraph are shown and described only in conventional or diagrammatic manner because they are only incidental to or background for our invention.

On pipe section 5, Fig. 1, is shown mounted a preferred form of our basket guide. While this device comprises essentially the combination both of a guide and a basket, and provides the uses and purposes of both, nevertheless, in addition their combination into one device in the manner of our invention brings about certain advantages and modes of operation that could not heretofore be realized when these devices were separate from each other.

The guide portion of the device essentially consists of upper and lower collars 9 and 10 respectively, to which are securely fastened in any suitable manner the desired number of powerful outwardly-bowed guide springs 11, these being shown in Fig. 1 as welded to the collars at 12 and 13 along the upper and lower edges of the springs respectively. Since the bore of collars 9 and 10 is slightly larger than the pipe 5, it is apparent that both these collars, and therefore the entire guide, are free to slide up and down on pipe section 5. To limit this sliding action any suitable form of stop means, preferably a stop ring 14, is securely fastened to pipe 5 in any suitable manner, as for instance by welding the ring to the pipe in holes 15. With such stop thus provided it is apparent that the guide cannot slide down on the pipe further than where the lower edge 16 of upper collar 9 will contact or butt against the upper edge 17 of stop ring 14, nor can the guide slide up along the pipe further than where the upper edge 18 of lower collar 10 contacts and butts against the lower edge 19 of the stop ring. When the pipe and basket are lowered into the well, the stop 14 butts against the bottom collar 10 and obviously pulls the basket guide downward with the pipe against the resisting tendency of the main guide springs 11, which press hard against the sides of the well to hold the device back. However, each time the pipe is raised to permit removal of the slips from the rotary table at the top of the well, the basket guide will remain practically stationary because of the frictional grip of springs 11 on the well wall, and the pipe will slide upwardly through it without substantially raising the basket guide. The length of such sliding, as determined by the distance between collars 9 and 10 and the length of the stop or stop ring 14, is preferably sufficient to permit easy removal of the slips from the table at the top, and of course the basket guide is located on the pipe a sufficient distance from couplings such as 6, and from any other obstruction on the pipe, so as not to interfere with the sliding of the pipe through the guide within the limits just mentioned.

Inside said main guide springs 11 and 11', in Figs. 1 and 2 respectively, there is mounted a flexible cement-catching basket indicated generally by the reference numerals 20 and 20', Figs. 1 and 2 respectively. Such cement - catching basket can be made in various ways and from various substances. For instance it can be made in the form of a strong flexible seamless member moulded of rubber, plastic, composition or other like substance, with or without fabric reinforcement therein, and such member can be moulded and vulcanized either on an open formed mandrel or in a pressure mould; or else such basket 20 can be formed of some strong sheet material, such as canvas duck, rayon or other fabric or sheet, the appropriate shape being first cut from such flat sheet, then turned over approximately into a frusto-conical shape, and this then sewed strongly along the seam; or else the basket may be woven seamless from some strong material, into the general form shown in Fig. 1, and the same rubberized or not as desired. The basket shown in the accompanying drawings is fabricated from sheet material, turned into frusto-conical shape, and then sewed along the seam, in conformity with one of the alternatives just indicated. Such basket 20 can be fastened into the device in any suitable manner, so long as the lower portion of the basket is fastened to the lower part of the guide, somewhere.

While in a general way the lower guide collar 10 should be regarded as a single member, nevertheless for special reasons which will be indicated later, we desire in our preferred form of the invention to make this collar 10 of two pieces, viz. the lower piece 10¹ and the upper piece 10², these being aligned and attached to each other by means of the joint 10³. As indicated, the purpose of this division of collar 10 into two pieces will be described later.

It will now be noticed that the lower part of basket 20 is fastened to the lower collar 10, and from the place of this fastening upward the basket gradually flares out radially until it reaches its largest dimension or diameter in the approximate area where guide springs 11 are bowed out to their largest diameter. This largest dimension of the basket should be such that the basket substantially spans the well to prevent the cement which enters the space above from settling downward past the basket in any substantial quantity. It will be understood however that since the shape of the well is somewhat irregular and the structure of the basket guide somewhat crude, the seal produced by the basket against the well often is not absolutely or theoretically perfect, but for practical purposes it need not be perfect. The reason is, first, that the cement is of rather thick sluggish consistency and does not flow through small crevices too readily; and, second, the well walls being at this time almost perfectly sealed by the impervious mud layer 3, the water below the basket acts somewhat like a buffer tending to resist entry of cement into the space below the basket and rather urging the cement upward, because the water displaced by the cement can most readily escape from the well at the surface of the earth. Consequently such small unsealed crevices as remain at 50, see Fig. 4, where the basket does not form squarely around the rectangular springs 11 to immediately meet and seal against the well wall, and also the crevice that remains between the inside of sliding collar 10 and pipe 1, are of no practical importance. It is sufficient that the basket guide should substantially prevent the cement from passing below the basket, rather than absolutely to prevent it.

Concerning the general shape of basket 20, we desire to point out that when the basket guide is in position in the well, and particularly when the weight of cement bears down on the inside of the basket and tends radially to expand it, we prefer that basket 20 should then belly out against the powerful guide springs 11 to receive strong support and reinforcement therefrom. In other words the strength and stiffness of springs 11 not only serve to centralize the pipe in the well, which sometimes is difficult especially when the well is drilled at an angle to the vertical, but these strong springs 11 also give useful support and reinforcement to the basket 20. When conditions are particularly severe we recommend equipping the device with a larger number of these main guide springs 11, around the device, than is indicated in the drawings where the number of these springs is reduced to permit greater clarity of illustration.

In our invention the basket 20 is held upright in the device by some suitable means. In Fig. 1 this means is illustrated as consisting of the basket supporting springs 21, fastened near their top by rivets 22 to the main guide springs 11, and fastened below this to the basket 20 in some suitable manner, as by rivets 23. These springs 21 serve not only to hold the basket 20 upright under the settling action of the cement, but being set normally to press the basket radially outward they also serve to hold the basket in expanded position. To aid further in maintaining the basket in full expanded position, we supply, preferably associated with supporting springs 21, the springy expander cleats or strips 24 extending transversally from the springs 21, as best shown in Figs. 1 and 3. The rivets 23 fasten these cleats 24, as well as the basket 20, to the springs 21. As is shown in the figures the cleats 24 bear against the inside of basket 20, particularly in the space between the main guide springs 11, and the natural resiliency of cleats 24, along with the normal outward pressure of springs 21, enables these cleats to hold the flexible basket 20 quite well expanded against the well wall in the spaces between the main guide springs 11.

Though the main guide springs 11 are somewhat resilient, nevertheless they are made quite strong and stiff to perform successfully their sometimes difficult task of centering the pipe in the well, but the basket supporting springs 21 are relatively lighter and more flexible than springs 11, the following being the reason therefor.

When the pipe and basket guide are lowered into the well, the latter is full of mud water, and since the inside of the pipe is sealed by closure 7, it is apparent that the flexible basket 20 must be relatively free to collapse inward so the mud water can readily collapse the basket during its descent through the well. Such collapse permits the mud water easily to by-pass from below the basket to above it as the basket descends, without subjecting the basket to severe hydraulic strains and pressures as might occur if the basket were held upright by direct attachment to the relatively stiff powerful guide springs 11. These might not permit the basket to collapse with sufficient ease and the basket might then be injured or torn off by the water pressure during descent, especially if the descent were rapid. However, by supporting the basket by means of the relatively light flexible springs 21, the basket readily collapses to permit easy by-passing of the mud water during descent, without injury to or serious strain on the basket.

We will now describe some other features of the flexible basket 20.

In order to aid this basket in contacting the heavy guide springs 11 to receive reinforcement therefrom, from the lowest possible point upward, we prefer to attach the basket to the bottom collar 10 approximately as shown in Figs. 1 and 5. That is, the basket is turned up along the upper portion 10² of lower guide collar 10, and to securely fasten this turned-up portion of the basket to the collar we wind the wire 25 tightly around the basket and collar, as shown. This is done before basket 20 and the collar piece 10² are assembled in the device. In fact this is done at a time when these parts are in the relative position shown by the full lines in Fig. 5. In this position the binding wire 25 obviously can be readily wound tightly over the basket material to fasten it to the collar member 10² securely. Before the winding commences, one end of wire 25 can be soldered to the collar member 10² as indicated at 26. The winding of the wire then proceeds, and the final end of wire 25 can be soldered to the preceding turns as indicated at 27, in Fig. 5. The wire will then remain permanently in place, and the basket will be securely and permanently fastened to the collar. Afterward, the basket can be turned inside out, i. e. turned up into its dotted line position shown in Fig. 5, which is the normal position that it will occupy in the device as shown in Fig. 1.

When the basket is made from sheet material such as canvas, rayon, or the like, rather than moulded from rubber or the like, then the features shown in Figs. 6 and 7 are helpful. It will be understood by fabric workers that a one-piece basket of this kind can readily be cut, turned and sewed up from an original flat sheet to take the frusto-conical shape indicated between the corners a, b, c and d of Fig. 6, such basket requiring sewing only along the vertical seam 31, where the ends are brought around and joined. For clarity in the drawing, only one strand of sewing is shown at 31, Fig. 6, but it will be understood that in practice there are many such strands of sewing side by side, as it is desired that the joint should be very secure. The sheet is cut so that originally the diameter of the basket across c—d, Fig. 6, is made substantially larger than the outside diameter of bottom collar 10² to which this part of the basket will be attached, but this excess size is provided across c—d (not a—b) to give fullness of diameter along its sides a—c and b—d, Fig. 6, so the basket can bear out against and receive support from the bowed springs 11 as far down along these springs as possible when the cement fills the basket. However, in order nicely and effectively to fasten the bottom of such basket on to the bottom collar member 10², it is necessary, or at least desirable, to reduce the bottom diameter of the basket from c—d, Fig. 6, to approximately the diameter e, Fig. 7, which corresponds approximately with the outside diameter of the bottom collar member 10². This contraction in diameter from c—d to e, is effected by pleating the bottom portion of the basket, one pleat preferably to come at the space between each two guide springs 11. These pleats 32 are shown in Figs. 6 and 7, and they are formed by drawing the fabric together in the manner shown, and then sewing the sides of the pleats together along their bottom corners 33, Fig. 7, throughout the height of the pleat. This height corresponds approximately with the portion of the basket that is to be bound upon the bottom collar 10² in the manner already described, see Fig. 5. While fastening the basket to the bottom collar the wire 25 is wound over the pleats 32 which are at that time turned over from their full line to their dotted line position shown in Fig. 7. In this simple manner, the basket 20, when made of fabric, can be given sufficient fullness or belly, even when made only of one piece, to bear against and receive maximum reinforcement from guide springs 11 when the cement is in place, and at the same time this bag can be nicely bound to the outside of collar member 10².

We now wish to explain the object and advantage of providing the lower guide collar 10 in two parts 10¹ and 10², and in attaching the main guide springs 11 to the collar portion 10¹ while the basket 20 is fastened to the collar portion 10². In practice, we consider that welding, which term as herein used includes brazing, is the best all-around mode of securely attaching the main guide springs 11 to the upper and lower guide collars 9 and 10; and since the amount of such welding must be considerable for secure attachment of the springs 11 to the collar, it is apparent that collar 10, if in one piece, would heat to a high temperature during such welding, and would therefore sometimes burn or impair the basket if the latter were attached to the collar at that time. However, by constructing the bottom collar 10 in two parts 10¹ and 10² as previously described, we are able to build the device without burning or injuring the basket 20. This is accomplished by our following novel method. Preferably, the upper ends of springs 11 are first securely welded to upper guide collar 9, but the lower ends of springs 11 are not yet welded to the bottom collar member 10¹. The basket 20, being fastened to collar member 10² as shown in Fig. 5, is now pushed up through the free lower ends of springs 11, as far as possible into the upper portion of the device inside springs 11, and the bottom collar member 10¹ will then be inserted and aligned inside of the lower free ends of springs 11, preparatory to welding. At this time collar member 10², of the bottom collar, will not be near or contacting member 10¹ of the bottom collar, but these two members will be substantially separated from each other. In this condition, the bottom collar member 10¹ will then be securely welded to the lower ends of springs 11. Of course collar member 10¹ will become very hot during this process, but this will be of no consequence because collar member 10² will not be contacting collar member 10¹, and basket 20 will not be injured in any way. When the parts have cooled off from the welding, collar member 10² will then be inserted into 10¹ along the joint 10³, see Fig. 1, and by a small amount of tack welding applied occasionally as at 28, see Fig. 1, the bottom collar members 10¹ and 10² are sufficiently secured to each other for all practical operating requirements. This occasional tack welding 28 produces but little heat as compared with the considerable welding 13 of springs 11 to bottom collar member 10¹, and consequently the basket is not impaired by this light tack welding 28, as it would be by welding 13 if the bottom collar 10 were all in one piece. The novel process of constructing the device as described in this paragraph, results in a good, strong, efficient basket guide unimpaired in any manner by the heat of welding, or otherwise. The essential part or feature of our novel process just described is that the collar member 10², with the basket 20 attached thereto, is not in contact with collar member 10¹ at the time that the guide springs 11 are welded to collar member 10¹. As already indicated we include in the term welding as used in this application not only the process commonly referred to by that name but also the allied process of brazing which is a very hot process also.

In the modified form of our invention shown in Figs. 2 and 4, the basket supporting springs 29 are not located immediately inside the main guide springs 11¹, like the springs 21 in Fig. 1, but instead these basket supporting springs 29 are located and are welded to the upper guide collar 9¹ in between the main guide springs 11¹, and springs 29 are also riveted at 30 to the basket 20¹ at a place in between the main guide springs 11¹. This has an advantage in that the normal outward pressure of springs 29, arising from the manner in which they are set, spreads or expands the basket more effectively in the area between guide springs 11¹, to urge it into contact with the well wall there, than when the basket supporting springs are located immediately inside the main guide springs as shown in Figs. 1 and 3. However, in the latter construction, the resilient springlike cleats 24 expand the basket quite satisfactorily in the space between the main guide springs 11. Also, under some circumstances, the relatively light basket supporting springs 21, see Figs. 1 and 3, are in better protected position, behind the large springs 11, than are springs 29, Figs. 2 and 4.

In Fig. 4 the expanded cleats 24¹ are of somewhat different shape from the cleats 24 shown in Fig. 3, and the neighboring cleats 24¹ of Fig. 4 are shown to overlap each other. A useful purpose not heretofore mentioned, of the cleats 24, Fig. 3, and cleats 24¹, Fig. 4, is that these cleats prevent the upper perimeter 200 of flexible basket 20 from folding or bending inward as it might sometimes do under the following conditions in the well. This may occur when the basket is located in a portion of the well where the bore has been excessively reduced by some accidental circumstance below the intended or specified bore. Under these circumstances the perimeter of the basket must be reduced to suit the reduced well bore, and to accommodate itself to this the basket perimeter has a tendency to bend or fold inward because there is nowhere else for the excess to go. Obviously this, however, may leave large gaps between the well wall and the basket, which is quite objectionable because cement can then settle or pass down in quantity through these large gaps to places below the basket, even though such cement may not pass down in quantity through relatively small cracks or crevices. This objection is either eliminated or at least greatly reduced by the cleats 24, Fig. 1, or 24¹, Fig. 4, which crowd such inward folds or bends of the basket outward toward the well bore, tending to bunch or crumple the excess basket material back and forth against itself, and then holding it all out either against or close to the well wall. At any rate the large gaps are thus eliminated, or reduced, and this minimizes the objection mentioned.

In Fig. 1, there is shown, on the upper outside perimeter of the basket, between the guide springs 11, metallic sheathing members 51 which tend to protect the outside of the lip of the basket against excessive abrasion while the device is traveling down with the pipe in the well; and similar metallic sheathing plates 52 are shown in Fig. 4, serving the same purpose.

We will now refer to the modifications shown in Figs. 8, 9, 10 and 11. These are details by which even the small crevices 50, Fig. 4, remaining between the basket 20 and the well wall adjacent the rectangular springs 11¹, can be eliminated if desired. In Figs. 8 and 9 the sides of the main guide springs 11 are shown beveled for a limited vertical distance on the inside, at 55. This beveling occurs only in the vicinity of the upper perimeter of the basket 20, and does not occur further along the spring 11. With this provision added, the basket 20, Fig. 9, can then accommodate itself readily to these bevels 55 on the spring to reach the well wall immediately at the spring and thus avoid the crevices 50 shown at these places in Fig. 4. The springs 11 in Fig. 3 are shown beveled in this manner, and the way in which the flexible basket 20 readily laps around these beveled edges of the springs is also shown in Fig. 3. If it be thought, however, that such beveling weakens the spring, then the same advantage can be realized by adding to each spring on the inside a member 56, Figs. 10 and 11, having the beveled sides 57 around which the basket 20 will accommodate itself in the same manner that it did around the bevels 55 in Figs. 8 and 9. The member 56 can be fastened to springs 11 by a rivet 58.

From the foregoing detailed description it is believed that the mode of operation of our basket guide will be apparent, but we briefly summarize same as follows:

During each of the many times that the pipe is lifted to permit removal of the slips at the top, during setting of the pipe, as already described, the pipe slides up through our basket guide, the latter remaining substantially stationary in the well, being so held by the strong frictional grip of the guide springs 11 against the wall of the well. Our basket guide therefore does not scrape off large quantities of mud from the mud layer 3, during such repeated lifting of the pipe, as frequently occurs with conventional guides fastened rigidly to the pipe so as to rise each time the pipe rises. This ability of our basket guide to remain stationary in the well, because of its being slidably mounted on the pipe rather than rigidly mounted, therefore avoids the accumulation of substantial quantities of mud immediately over the basket, as the latter goes down to final position with the pipe, and this is a substantial advantage. It is of course understood that after the pipe slid up through the basket, for the purpose just mentioned, and when the pipe later descends to admit the next pipe section into the top of the well, the stop means 14, whether in the form of a ring as shown, or other stop or stop expedient, comes down to butt against the bottom collar 10 of our basket guide and from that instant on the stop means pulls the basket guide down through the well, until the pipe is again lifted for removal of the slips, at which time our basket guide again remains stationary while the pipe rises through it, subject of course to the limits between our upper and lower guide collars 9 and 10. In this manner the space above our basket guide remains comparatively free of scraped-off mud and is therefore comparatively clean when the pipe and basket reach the desired depth. Cementing can then proceed without commingling the cement with excessive loose mud collected over the basket, which would be undesirable.

When the cement, under pumping, flows out from the pipe through ports 8, Fig. 1, our basket guide prevents the settling of such cement in any substantial quantity downward to places below the basket, and thereby forces such cement upward, usually a substantial distance above ports 8. At this time the powerful guide springs 11, forcibly contacting the sides of the well, center the pipe accurately in the well irrespective of whether the well is straight or out of plumb. With the pipe thus centered, the cement presently sets with a substantial and uniform thickness of cement all around the pipe to make a good effective cement plug that successfully seals off the unwanted fluids from the earth formation adjacent this plug. During the foregoing operation, when the cement settles into the cement-catching basket 20, as described, it naturally bellies the basket outward into contact with the strong guide springs 20 which give their support to the basket and reinforce it. This does much to help or relieve the basket-supporting springs 21, Fig. 1, or 29, Fig. 2, in their work. The considerable strength and stiffness of the main guide springs 11 therefore serve the double purpose, first, of effectively reinforcing and supporting the basket against the cement load, and second, of centering the pipe to make a good cement plug, which is sometimes difficult when the inclination of the well is substantial.

During the lowering of the pipe and gasket guide through the mud water that fills the well, the powerful guide springs 11 hold the pipe and basket guide nicely centered in the well, but the basket 20 is held in upright position by basket-supporting means consisting preferably of the basket-supporting springs 21, Fig. 1, and 29, Fig. 2. These basket-supporting springs are relatively more flexible than the strong guide springs 11, and consequently during descent the basket is free to collapse inward toward the pipe to permit the mud water in the well to by-pass from below to above the basket without straining or injuring the latter. However, when the basket is at rest, the basket-supporting springs are set so as to tend to press or spread the basket radially outward to maintain as good a seal as is practicable, within the limits of such devices, against the well wall.

Various modifications may be made in our basket guide without departing from our invention, or the spirit thereof, as embraced in the terms of the appended claims.

We claim:

1. A basket guide adapted to be mounted on pipe and lowered into a well preparatory to cementing, said basket guide comprising upper and lower collars spaced substantially apart from each other and adapted to embrace and slide along the pipe, outwardly bowed springs fastened to said upper and lower collars to form a guide, a flexible cement catching basket fastened to said lower collar and rising therefrom inside said springs, the wall of said flexible cement catching basket flaring out radially and upwardly to substantially span and seal the space between the pipe and the wall of the well, and a stop adapted to be fastened to the pipe between said upper and lower collars and adapted also to butt against said upper and lower collars, said guide and basket being free to slide a substantial distance along said pipe in both directions such sliding movement being however limited by the butting of said stop against said upper and lower collars.

2. A basket guide adapted to be mounted on pipe and lowered into a well preparatory to cementing, said basket guide comprising upper and lower collars spaced apart from each other, outwardly bowed springs fastened to said upper and lower collars to form a guide, a flexible cement catching basket inside said springs, the wall of said cement catching basket flaring out radially and upwardly to substantially span and seal the space between the pipe and the wall of the well, and resilient means on said guide contacting said flexible cement catching basket near the upper periphery thereof between said outwardly bowed springs, said resilient means being flexed to exert a radially outward pressure on said flexible basket near its upper periphery and between said outwardly bowed springs, to radially expand said flexible basket between said outwardly bowed springs to improve the sealing action of said flexible cement catching basket in the well.

3. A basket guide adapted to be mounted on pipe and lowered into a well preparatory to cementing, said basket guide comprising upper and lower collars spaced apart from each other, relatively stiff outwardly bowed guide springs fastened to said upper and lower collars to form a guide, a flexible cement catching basket inside said guide springs, the wall of said cement catching basket flaring out radially and upwardly to substantially span and seal the space between the pipe and the wall of the well, and basket supporting springs that are relatively more flexible than said stiff outwardly bowed guide springs, said basket supporting springs being attached to said cement catching basket near the upper periphery thereof to support said upper periphery in upright radially expanded position but permitting said basket to contract radially inward substantially independently of said relatively stiff outwardly bowed guide springs.

4. A basket guide adapted to be mounted on pipe and lowered into a well preparatory to cementing, said basket guide comprising upper and lower collars spaced apart from each other, relatively stiff outwardly bowed guide springs fastened to said upper and lower collars to form a guide, a flexible cement catching basket inside said guide springs, said basket being fastened at its bottom to said lower collar and the wall of said basket flaring out radially and upwardly to substantially span and seal the space between the pipe and the wall of the well, and basket supporting springs that are relatively more flexible than said stiff outwardly bowed guide springs, said basket supporting springs being attached to said cement catching basket near the upper periphery thereof to support said upper periphery in upright position, said basket supporting springs being flexed to radially expand said flexible basket toward the wall of the well but permitting said basket to contract radially inward substantially independently of said relatively stiff outwardly bowed springs, whereby fluid below the basket can with relative ease collapse the basket and bypass from below to above the basket as the basket descends through the well, said basket supporting springs being fastened to said guide above the place where they are fastened to said basket.

5. A basket guide adapted to be mounted on pipe and lowered into a well preparatory to cementing, said basket guide comprising upper and lower collars spaced apart from each other, relatively stiff outwardly bowed guide springs fastened to said upper and lower collars to form a guide, a flexible cement catching basket inside said guide springs, said basket being fastened at its bottom to said lower collar and the wall of said basket flaring out radially and upwardly to substantially span and seal the space between the pipe and the wall of the well, and basket supporting springs that are relatively more flexible than said stiff outwardly bowed guide springs, said basket supporting springs being attached to said cement catching basket near the upper periphery thereof to support said upper periphery in upright position, said basket supporting springs being flexed to radially expand said flexible basket toward the wall of the well but permitting said basket to contract radially inward substantially independently of said relatively stiff outwardly bowed springs, whereby fluid below the basket can with relative ease collapse the basket and bypass from below to above the basket as the basket descends through the well.

WILLIAM WALTER HARTMAN.
ROBERT ALEXANDER STEPS.

References Cited in the file of this patent

UNITED STATES PATENTS

| Number | Name | Date |
|---|---|---|
| 1,561,768 | Baker | Nov. 17, 1925 |
| 1,757,381 | Morgan et al. | May 6, 1930 |
| 1,775,376 | Steps et al. | Sept. 9, 1930 |
| 1,979,802 | Kinley | Nov. 6, 1934 |
| 2,312,600 | Steps | Mar. 2, 1943 |
| 2,392,145 | Hall | Jan. 1, 1946 |